US012572350B2

(12) United States Patent
Kim

(10) Patent No.: US 12,572,350 B2
(45) Date of Patent: Mar. 10, 2026

(54) APPARATUS AND METHOD FOR OPTIMALLY UPDATING VEHICLE CONTROLLER

(71) Applicant: HYUNDAI AUTOEVER CORP., Seoul (KR)

(72) Inventor: Chong Kwan Kim, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 214 days.

(21) Appl. No.: 18/533,929

(22) Filed: Dec. 8, 2023

(65) Prior Publication Data

US 2024/0211242 A1     Jun. 27, 2024

(30) Foreign Application Priority Data

Dec. 23, 2022     (KR) ......................... 10-2022-0182853

(51) Int. Cl.
*G06F 8/65* (2018.01)

(52) U.S. Cl.
CPC ..................................... *G06F 8/65* (2013.01)

(58) Field of Classification Search
CPC ... G06F 8/65; G06F 8/658; G06F 8/71; H04L 67/34
See application file for complete search history.

(56) References Cited

U.S. PATENT DOCUMENTS 9,128,798 B2 *   9/2015   Hoffman .................... G06F 8/65
10,942,725 B2 *   3/2021   Jayaraman .............. H04W 4/50

11,144,300 B2   10/2021   Jeong et al.
11,561,786 B2    1/2023   Kono
12,499,718 B2 *  12/2025   Sakurai ..................... G06F 8/65
2007/0294684 A1  12/2007   Kumashiro
(Continued)

FOREIGN PATENT DOCUMENTS

JP          6820134 B2     1/2021
KR      20190130756 A     11/2019
(Continued)

OTHER PUBLICATIONS

Office Action cited in corresponding Korean patent application No. 10-2022-0182853; Sep. 23, 2024; 18 pp.

*Primary Examiner* — Marina Lee
(74) *Attorney, Agent, or Firm* — Lempia Summerfield Katz LLC

(57) ABSTRACT

An apparatus for optimally updating a vehicle controller may update a first version file of the vehicle controller to a second version file. The apparatus may include an update determination module and an update performance module. The update determination module may be configured to select an update method of the vehicle controller based on an importance of the vehicle controller and an update time of the second version file. The update method may include a full update method, a partial update method, a compressed update method, and a difference update method. The update determination module may also be configured to generate a transmission file for the second version file according to the selected update method. The update performance module may be configured to transmit the transmission file to the vehicle controller to update the first version file of the vehicle controller to the second version file.

20 Claims, 11 Drawing Sheets

(56) References Cited

U.S. PATENT DOCUMENTS

| | | | |
|---|---|---|---|
| 2020/0192655 A1* | 6/2020 | Jeong | .................. G07C 5/0816 |
| 2021/0389939 A1 | 12/2021 | Kono | |
| 2022/0326936 A1 | 10/2022 | Goto | |
| 2023/0315440 A1* | 10/2023 | Clark | ................. G06F 11/0751 |

FOREIGN PATENT DOCUMENTS

| | | | |
|---|---|---|---|
| KR | 20200034036 A | 3/2020 |
| KR | 20200051211 A | 5/2020 |
| KR | 20200072018 A | 6/2020 |

* cited by examiner

*FIG. 8*

| Classification | | Full | Partial | Compressed | Differential |
|---|---|---|---|---|---|
| File size | | 1M byte | 400k byte | 200k byte | 30k byte |
| Transmission unit | | 8 byte | 8 byte | 8 byte | 8 byte |
| Memory deletion time | | 10 seconds | 5 seconds | 10 seconds | 5 seconds |
| Update | File recovery time | ' | ' | 5 seconds | 6 seconds |
| | Transmission time | 250 seconds | 100 seconds | 50 seconds | 7.5 seconds |
| Update time | | 260 seconds | 105 seconds | 65 seconds | 18.5 seconds |

APPARATUS AND METHOD FOR OPTIMALLY UPDATING VEHICLE CONTROLLER

CROSS REFERENCE TO RELATED APPLICATION

This application claims the benefit of and priority to Korean Patent Application No. 10-2022-0182853, filed on Dec. 23, 2022, the entire contents of which are hereby incorporated by reference.

TECHNICAL FIELD

The present disclosure relates to an apparatus and method for optimally updating a vehicle controller.

BACKGROUND

With increasing development of electronic equipment for vehicles for the convenience and safety of vehicle drivers and passengers, the types of vehicle controllers are becoming more diverse and the functions of the vehicle controllers are becoming more sophisticated. The vehicle controllers need to be updated to correct errors, improve performance, strengthen security, add new functions, and apply new services of the vehicle controllers.

The update of a vehicle controller may be performed by downloading the latest version file from a vehicle controller update server via a wireless communication network, and transmitting the downloaded latest version file to the vehicle controller via a vehicle internal network while a vehicle is stopped or the vehicle is not driving (IG-OFF).

However, when updating a vehicle controller while a vehicle is not driving, a vehicle power may be discharged when an update performance time of the vehicle controller is prolonged. In addition, a vehicle user is unable to use the vehicle while the vehicle controller is being updated, which may result in customer complaints.

SUMMARY

Embodiments of the present disclosure provide an optimal vehicle controller update apparatus and method for updating a vehicle controller according to an update method considering the importance of the vehicle controller.

Further, embodiments of the present disclosure provide an optimal vehicle controller update apparatus and method for updating a vehicle controller according to an update method considering an update time.

Further yet, embodiments of the present disclosure provide an optimal vehicle controller update apparatus and method for calculating an update time for each update method.

The technical aspects of the present disclosure are not limited to those mentioned above. Other technical aspects not mentioned herein should be clearly understood by those having ordinary skill in the art to which the present disclosure pertains from the following description.

According to an embodiment, an apparatus for optimally updating a vehicle controller from a first version file of the vehicle controller to a second version file is provided. The apparatus may include an update determination module. The update module may be configured to select an update method of the vehicle controller based on an importance of the vehicle controller and an update time of the second version file. The update method may include at least one of a full update method, a partial update method, a compressed update method, or a difference update method. The update determination module may also be configured to generate a transmission file for the second version file according to the selected update method. The apparatus may additionally include an update performance module configured to transmit the transmission file to the vehicle controller to update the first version file of the vehicle controller to the second version file . . . .

In an embodiment, the update determination module may be configured to, when the vehicle controller is a controller related to vehicle operation safety, including an engine controller or a transmission controller, determine that the importance of the vehicle controller is high, select the full update method as the update method of the vehicle controller, and generate the second version file as the transmission file according to the full update method.

In an embodiment, the update determination module may be configured to, when the update method with a smallest update time of the second version file is the partial update method, select the partial update method as the update method of the vehicle controller as, and generate changed sectors in the second version file as the transmission file according to the partial update method.

In an embodiment, the update determination module may be configured to, when the update method with the smallest update time of the second version file is the compressed update method, select the compressed update method as the update method of the vehicle controller, compress the second version file according to the compressed update method, and generate the second version file as the transmission file.

In an embodiment, the update determination module may be configured to, when the update method with the smallest update time of the second version file is the difference update method, select the difference update method as the update method of the vehicle controller, and generate a difference between the first version file and the second version file as the transmission file according to the difference update method.

In an embodiment, the update time of the second version file according to the full update method and the partial update method may include a transmission time, a memory deletion time, and a memory write time.

In an embodiment, the update time of the second version file according to the compressed update method and the difference update method may include a transmission time, a memory deletion time, a memory write time, and a recovery time.

In an embodiment, the update method may be the compressed update method, and the recovery time may be a time to decompress the transmission file and restore the same to the second version file.

In an embodiment, the update method may be the difference update method, and the recovery time may be a time for generating the second version file using the first version file and the transmission file.

According to another embodiment, a method for optimally updating a vehicle controller from a first version file of the vehicle controller to a second version file is provided. The method may include selecting an update method of the vehicle controller based on an importance of the vehicle controller and an update time of the second version file. The update method may include at least one of a full update method, a partial update method, a compressed update method, or a difference update method. The method may also include generating a transmission file for the second version file according to the selected update method. The method may additionally include transmitting the transmission file to the vehicle controller to update the first version file of the vehicle controller to the second version file.

In an embodiment, selecting the update method of the vehicle controller may include, when the vehicle controller is a controller related to vehicle operation safety, including an engine controller or a transmission controller, determining that the importance of the vehicle controller is high, selecting the full update method as the update method of the vehicle controller, and generating the second version file as the transmission file according to the full update method.

In an embodiment, selecting the update method of the vehicle controller may include calculating the update time of the second version file for each update method, and selecting an update method with a smallest calculated update time as the vehicle update method.

In an embodiment, the update time of the second version file according to the full update method and the partial update method may be calculated by summing up a transmission time, a memory deletion time, and a memory write time.

In an embodiment, the update time of the second version file according to the compressed update method and the difference update method may be calculated by summing up a transmission time, a memory deletion time, a memory write time, and a recovery time.

In an embodiment, the update method of the vehicle controller may be the compressed update method, and the recovery time may be a time to decompress the transmission file and restore the same to the second version file.

In an embodiment, the update method of the vehicle controller may be the difference update method, and the recovery time may be a time for generating the second version file using the first version file and the transmission file.

In an embodiment, selecting the update method of the vehicle controller may include, when the update method with the smallest calculated update time of the second version file is the partial update method, selecting the partial update method as the update method of the vehicle controller. In an embodiment, generating the transmission file may include generating changed sectors in the second version file as the transmission file according to the partial update method.

In an embodiment, selecting the update method of the vehicle controller may include, when the update method with the smallest calculated update time of the second version file is the compressed update method, selecting the compressed update method as the update method of the vehicle controller. In an embodiment, generating the transmission file may include compressing the second version file according to the compressed update method, and generating the compressed second version file as the transmission file.

In an embodiment, selecting the update method of the vehicle controller may include, when the update method with the smallest update time of the second version file is the difference update method, selecting the difference update method as the update method of the vehicle controller. In an embodiment, generating the transmission file may include generating a difference between the first version file and the second version file as the transmission file according to the difference update method.

According to an embodiment of the present disclosure, an optimal vehicle controller update apparatus and method for updating a vehicle controller according to an update method based on an importance of the vehicle controller are provided.

According to an embodiment of the present disclosure, an optimal vehicle controller update apparatus and method for updating a vehicle controller according to an update method selected based on an update time are provided.

According to an embodiment of the present disclosure, an optimal vehicle controller update apparatus and method for calculating an update time for each update method are provided.

In addition, various benefits that may be directly or indirectly identified through the specification may be provided.

BRIEF DESCRIPTION OF THE DRAWINGS

FIG. 8 is a table illustrating update time calculation for various update methods according to embodiments of the present disclosure.

DETAILED DESCRIPTION

Hereinafter, embodiments of the present disclosure are described in detail with reference to the accompanying drawings. The advantages and features of the present disclosure and methods of achieving the same should be apparent to those having ordinary skill in the art from the following embodiments that are described in detail with reference to the accompanying drawings.

It should be noted, however, that the technical spirit of the present disclosure is not limited to the following embodiments. Rather, the technical ideas of the present disclosure may be implemented in various different forms. The embodiments described below are provided to fully, thoroughly and completely convey the technical spirit of the present disclosure to those having ordinary skill in the technical art to which the present disclosure pertains. The technical spirit of the present disclosure is defined by the scope of the claims.

In the following description, when it was determined that a detailed description of a related known technology or function may obscure the gist of the present disclosure, the detailed description thereof has been omitted. Hereinafter, several embodiments of the present disclosure are described with reference to the accompanying drawings.

When a component, device, element, or the like of the present disclosure is described as having a purpose or performing an operation, function, or the like, the component, device, or element should be considered herein as being "configured to" meet that purpose or perform that operation or function.

Terms such as "~unit", "~part," "~block," "~member," "~module," "~controller," and the like may denote a unit for performing at least one function or operation. For example, the terms may refer to at least one hardware component such as a field-programmable gate array (FPGA) or an application specific integrated circuit (ASIC), at least one software stored in a memory, or at least one process performed by a processor.

Figure 1:
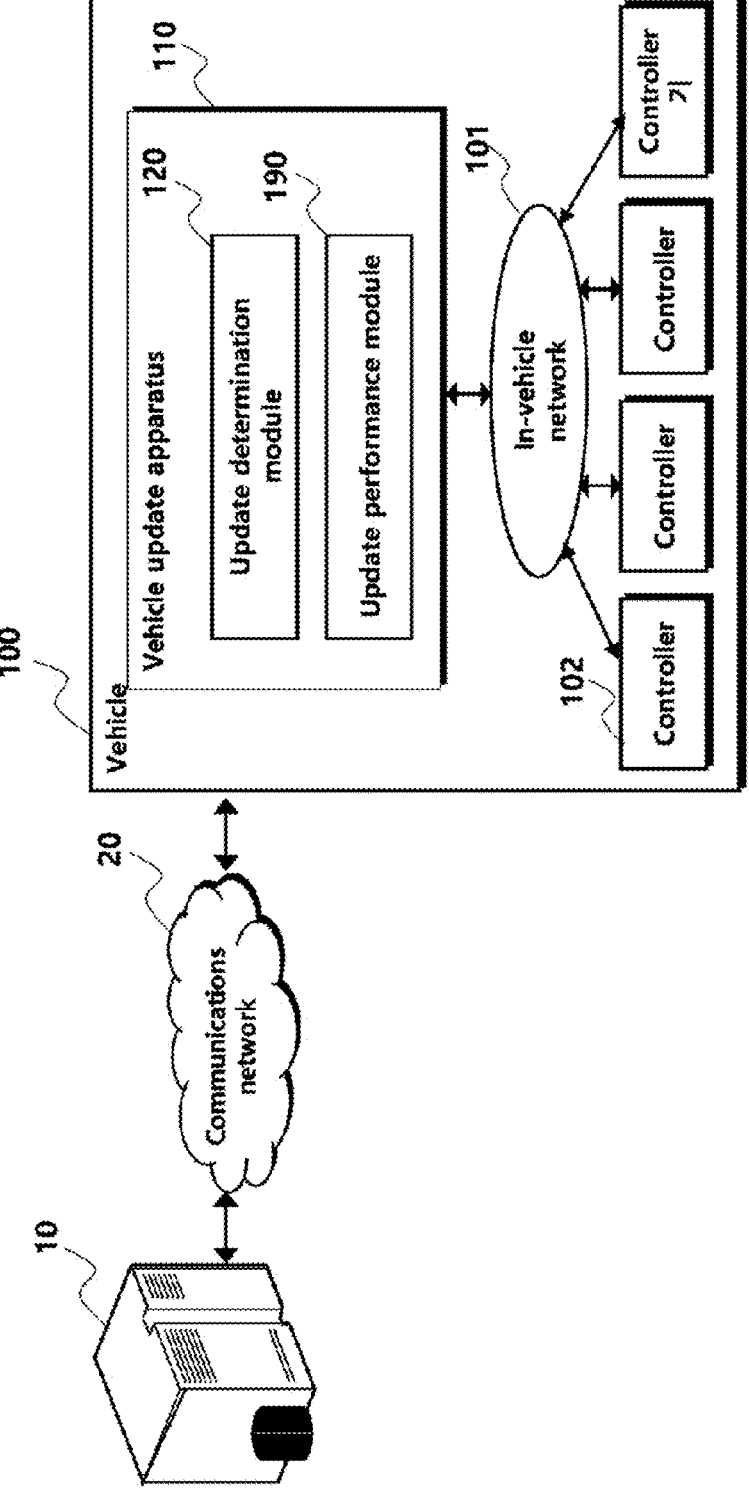
FIG. 1 is a diagram illustrating a network environment in which an apparatus for optimally updating a vehicle controller, according to an embodiment of the present disclosure, may be utilized.

FIG. 1 is a diagram illustrating a network environment in which an apparatus for optimally updating a vehicle controller, according to an embodiment of the present disclosure, may be utilized.

Referring to FIG. 1, the network environment in which the apparatus for optimally updating a vehicle controller, according to an embodiment of the present disclosure, may be utilized may include a vehicle controller update server 10, a communication network 20, and a vehicle 100.

The vehicle controller update server 10 may store and manage control files for vehicles and vehicle controllers. The files for vehicles and vehicle controllers may include a first version file and a second version file. The first version file may be the current version file currently used in the vehicle controller (hereinafter referred to as 'current version file'). The second version file may be the latest version file including information to be updated and may be a higher version file than the first version file (hereinafter referred to as the 'latest version file'). The latest version file may include programs necessary to correct errors, improve performance, strengthen security, add new functions, and apply new services, as well as data necessary to execute the programs of the vehicle controller. The first version file and the second version file may be ROM (Read Only Memory) files.

The vehicle controller update server 10 may register a new version of the file provided by a vehicle manufacturer as the latest version file. The vehicle controller update server 10 may transmit the latest version file to a vehicle controller update apparatus 110 via the communication network 20. In addition, the vehicle controller update server 10 may transmit the latest version file via the communication network 20 at the request of a vehicle controller update apparatus 110.

The communication network 20 may be an external wireless network that allows the vehicle controller update apparatus 110 to download the latest version file from the vehicle controller update server 10. As an example, the communication network 20 may include a mobile communication network, a wireless Internet network, and/or a local area network.

A mobile communication network may be a mobile communication network constructed according to technical standards or communication methods for mobile communication, such as Global System for Mobile communication (GSM), Code Division Multi Access (CDMA), Long Term Evolution (LTE), and/or Long Term Evolution Advanced (LTEA). The wireless Internet network may include Wireless LAN (WLAN), Wi-Fi, High Speed Downlink Packet Access (HSDPA), and/or High Speed Uplink Packet Access (HSUPPA). The local area network may include Bluetooth, ZigBee, Near Field Communication (NFC), and/or Wireless USB.

The vehicle 100 may include the vehicle controller update apparatus 110, an in-vehicle network 101, and a vehicle controller 102. The vehicle 100 may include an electric vehicle (EV) or plug-in hybrid (PHEV) that receives electricity by charging from outside.

The vehicle controller update apparatus 110 may update the vehicle controller 102 by downloading the latest version file from the vehicle controller update server 10 via the communication network 20. For example, the vehicle controller update apparatus 110 may update the current version file of the vehicle controller 102 to the latest version according to the update method selected based on the importance of the vehicle controller 102 and the update time of the vehicle controller 102. The latest version file update method may be an update method selected from a full update method, a partial update method, a compressed update method, and a difference update method.

As an example, the vehicle controller update apparatus 110 may include an update determination module 120 and an update performance module 190. The update determination module 120 may select an update method for the latest version file, and may generate a transmission file for the latest version file according to the selected update method. The update performance module 190 may update the current version file of the vehicle controller 102 to the latest version by transmitting the transmission file to the corresponding vehicle controller 102.

The vehicle controller update apparatus 110 may be provided integrally with the vehicle 100, or may be manufactured in a separate configuration from the vehicle 100 and installed or attached to the vehicle 100. In some examples, a portion of the vehicle controller update apparatus 110 may be implemented integrally with the vehicle 100, and the remaining portions thereof may be manufactured in a separate configuration from the vehicle 100 and installed or attached to the vehicle 100.

The in-vehicle network 101 may be an in-vehicle communication network used when the vehicle controller update apparatus 110 updates the corresponding vehicle controller 102 to the latest version file. For example, the in-vehicle network 101 may include Controller Area Network (CAN), CAN FID Controller Area Network with Flexible Data-rate (CAN FID), Local Interconnect Network (LIN), FlexRay, and/or Media Oriented Systems Transport (MOST).

The vehicle controller 102 may receive the latest version file from the vehicle controller update apparatus 110 via the in-vehicle network 101, and may update the current version file to the latest version file.

The vehicle controller 102 may be a controller that controls electronic devices within the vehicle 100. An electronic device may be an electrical or electronic device mounted in a vehicle for the purpose of driving a vehicle and for the convenience and safety of vehicle operators. The electronic device may be an electrical or electronic device related to a powertrain, a body, a chassis, an in-vehicle network, and/or multimedia.

The vehicle controller 102 may include an Engine Control Unit (ECU), a Transmission Control Unit (TCU), an Integrated Body control Unit (IBU), a Battery Management System (BMS), and/or an Idle Stop & Go (ISG) system. The ECU may perform overall control of the engine of the vehicle. The TCU may perform overall control of the transmission of the vehicle. The IBU may be an integrated control of Body Control Unit (BCM), Smart Key System (SKS), and/or Tire Pressure Monitoring System TPMS). The BMS may perform overall control of the battery that supplies power to the electronic device of the vehicle. The ISG system may perform the function of turning an engine off (Idle Stop) when the vehicle engine remains idle for a certain period of time due to stopping of the vehicle, and then turning the engine on (Go) when the vehicle is required to restart.

Figure 2:
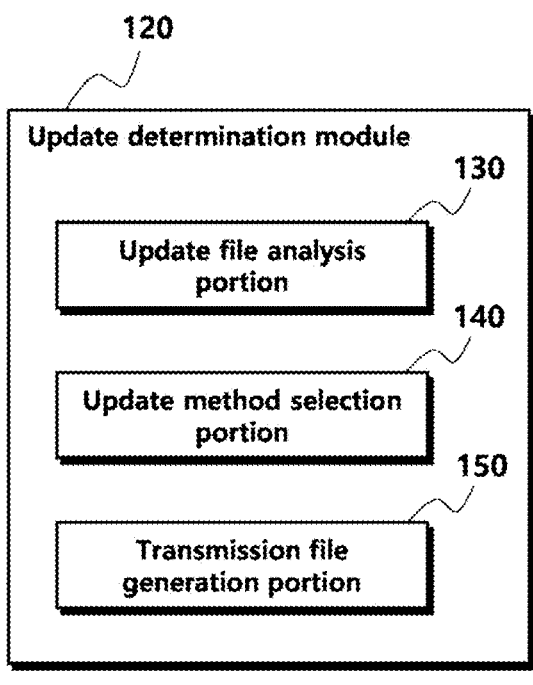
FIG. 2 is a diagram illustrating an update determination module of an apparatus for optimally updating a vehicle controller, according to an embodiment of the present disclosure.

FIG. 2 is a diagram illustrating an update determination module of the apparatus for optimally updating a vehicle controller, according to an embodiment of the present disclosure.

Referring to FIG. 2, the update determination module 120 of the apparatus for optimally updating a vehicle controller according to an embodiment of the present disclosure may include an update file analysis portion 130, an update method selection portion 140, and a transmission file generation portion 150.

As an example, the update determination module 120 may select the update method of the vehicle controller 102 based on the importance of the vehicle controller 102 and the update time of the latest version file, and may generate a transmission file for the latest version file according to the selected update method.

The update method may be selected from among a full update method, a partial update method, a compressed update method, and a difference update method. The full update method may be a method of updating the vehicle controller 102 by transmitting the entire latest version file. The partial update method may be a method of updating the vehicle controller 102 by transmitting changed sectors that have changes compared to the current version file among the latest version files. The compressed update method may be a method of updating the vehicle controller 102 by transmitting a compressed file that compresses the latest version file. The difference update method may be a method of updating the vehicle controller 102 by transmitting a difference file that extracts the difference between the current version file and the latest version file.

When an update target vehicle controller 102 is an important controller related to the safety of vehicle operation, the update determination module 120 may select the full update method as the method for updating the vehicle controller 102, and may generate a transmission file for the latest version file according to the selected full update method. When the vehicle controller 102 is not an important controller, the update determination module 120 may calculate the update time for each update method. The vehicle controller 102 may select the update method with the smallest update time as the method for updating the vehicle controller 102, and may generate a transmission file for the latest version file according to the selected update method.

Hereinafter, the update file analysis portion 130, the update method selection portion 140, and the transmission file generation portion 150 of the update determination module 120 are described in more detail.

The update file analysis portion 130 may check the importance of the vehicle controller 102, calculate the update time for each update method, and provide the same to the update method selection portion 140.

As an example, when the vehicle controller 102 is an important vehicle controller related to vehicle operation safety, the update file analysis portion 130 may provide the importance of the vehicle controller 102 to the update method selection portion 140. The important vehicle controller related to vehicle operation safety may include an engine controller or a transmission controller.

When the vehicle controller 102 is not an important vehicle controller related to vehicle operation safety, the update file analysis portion 130 may calculate the update time for each update method, and may provide the same to the update method selection portion 140. The update method may include a partial update method, a compressed update method, and a difference update method, and may also include a full update method.

The update selection portion 140 may select an update method for the vehicle controller by considering the importance of the vehicle controller 102 provided by the update file analysis portion 130. When the update target vehicle controller 102 is an important controller, the selected update method may be the full update method.

When the update target vehicle controller 102 is not an important controller, the update method selection portion 140 may select an update method of the vehicle controller 102 by considering the update time for each update method provided by the update file analysis portion 130. In this case, the selected update method may be an update method selected from a partial update method, a compressed update method, and a difference update method.

The transmission file generation portion 150 may generate a transmission file for the latest version of the file according to the update method selected by the update selection portion 140. For example, the transmission file may be one of the entire latest version file, a compressed file that compresses the latest version file, a partial file that extracts sectors with changes compared to the current version file among the latest version files, and a difference file that extracts the difference between the current version file and the latest version file.

Figure 3:
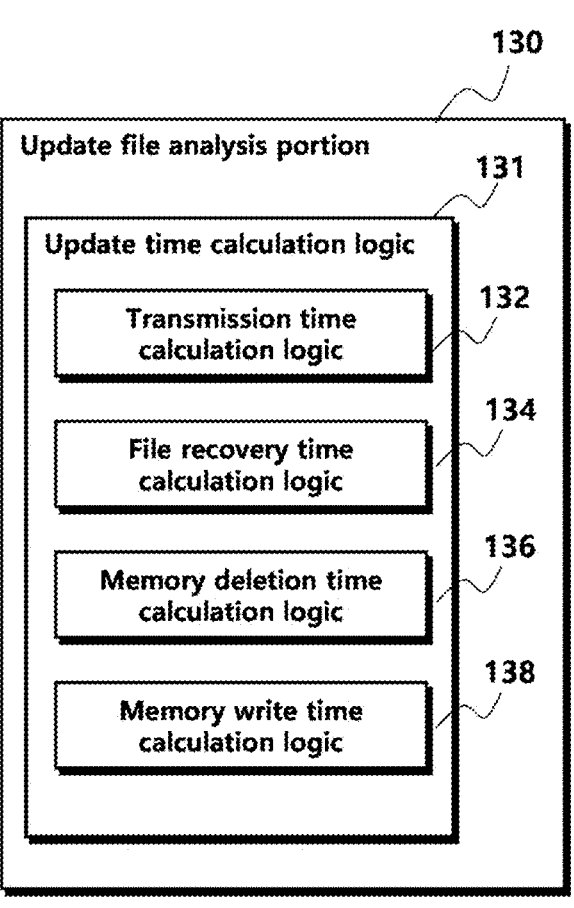
FIG. 3 is a diagram illustrating an update file analysis portion of an apparatus for optimally updating a vehicle controller, according to an embodiment of the present disclosure.

FIG. 3 is a diagram illustrating an update file analysis portion of the apparatus for optimally updating a vehicle controller, according to an embodiment of the present disclosure.

Referring to FIG. 3, the update file analysis portion of the apparatus for optimally updating a vehicle controller according to an embodiment of the present disclosure may include an update time calculation logic 131.

The update time calculation logic 131 may calculate the update time for each update method.

As an example, the update time calculation logic 131 may include a transmission time calculation logic 132, a file recovery time calculation logic 134, a memory deletion time calculation logic 136, a memory write time calculation logic 138, and a summation logic 139 for each update method.

The transmission time calculation logic 132 may calculate a transmission time according to an update method. For example, in the case of the full update method, the transmission time calculation logic 132 may calculate the transmission time for the entire latest version file as the transmission time. In the case of the partial update method, the transmission time calculation logic 132 may calculate the transmission time for the changed sector with changes among the latest version files as the transmission time. In the case of the compressed update method, the transmission time calculation logic 132 may calculate the transmission time for the compressed file that compresses the latest version file as the transmission time. In the case of the difference update method, the transmission time calculation logic 132 may calculate the transmission time for the difference file of the latest version file as the transmission time.

The file recovery time calculation logic 134 may calculate a file recovery time according to an update method. For example, in the case of the compressed update method, the file recovery time calculation logic 134 may calculate the time required to decompress the compressed file of the latest version file and restore the original latest version file as the file recovery time. In the case of the difference update method, the file recovery time calculation logic 134 may calculate the time required to restore the latest version file as the file recovery time using the current version file and the difference file. The file recovery time calculation logic 134 may not calculate a separate file recovery time in the case of the full update method and the partial update method. This is because, unlike the compressed update method and difference update method, the full update method and partial update method do not require a separate file restoration process.

The memory deletion time calculation logic 136 may calculate a memory deletion time according to an update method. For example, in the case of the full update method, the memory deletion time calculation logic 136 may calculate the deletion time for the entire latest version file as the memory deletion time. In the case of the partial update method, the memory deletion time calculation logic 136 may calculate the deletion time for the changed sector with changes among the latest version files as the memory deletion time. In the case of the compressed update method, the memory deletion time calculation logic 136 may calculate the deletion time for the compressed file that compresses the latest version file as the memory deletion time. In the case of the difference update method, the memory deletion time calculation logic 136 may calculate the time to delete the sectors where the difference between the current version file and the latest version file is located as the memory deletion time.

The memory write time calculation logic 138 may calculate a memory write time according to an update method. For example, in the case of the full update method, the memory write time calculation logic 138 may calculate the memory write time for the entire latest version file as the memory write time. In the case of the partial update method, the memory write time calculation logic 138 may calculate the memory write time for the changed sector with changes among the latest version files as the memory write time. In the case of the compressed update method, the memory write time calculation logic 138 may calculate the memory write time for the compressed file that compresses the latest version file as the memory write time. In the case of the difference update method, the memory write time calculation logic 138 may calculate the memory write time for the difference between the current version file and the latest version file as the memory write time.

the update file analysis portion 130 may provide the update time calculated for each update method and the importance of the vehicle controller 102 to the update method selection portion 140. For example, the update file analysis portion 130 may provide the times calculated for the transmission time calculation logic 132, the file recovery time calculation logic 134, the memory deletion time calculation logic 136, and the memory write time calculation logic 138 to the update method selection portion 140.

Figure 4:
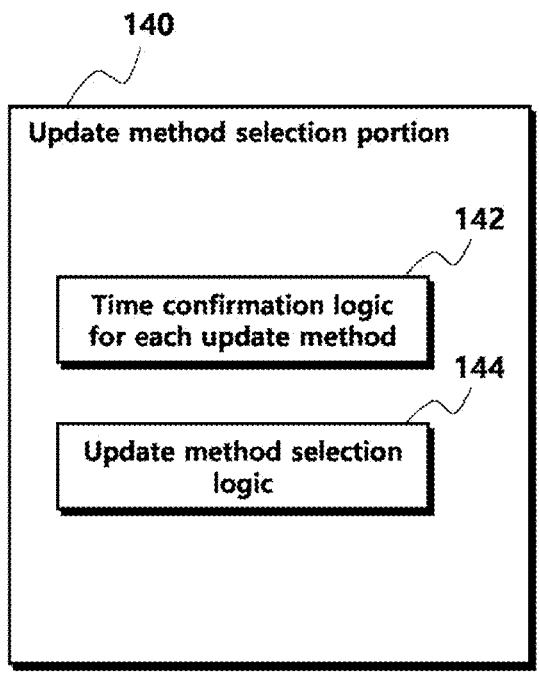
FIG. 4 is a diagram illustrating an update method selection portion of an update determination module, according to an embodiment of the present disclosure.

FIG. 4 is a diagram illustrating an update method selection portion of the update determination module, according to an embodiment of the present disclosure.

Referring to FIG. 4, the update method selection portion 140 of the update determination module according to an embodiment of the present disclosure may include an update time confirmation logic 142 and an update method selection logic 144.

The time confirmation logic 142 for each update method may add up the update times for each update method provided by the update file analysis portion 130, and may provide the sum result to the update method selection logic 144.

The time confirmation logic 142 for each update method may calculate the update time for each update method by adding up the times calculated from the transmission time calculation logic 132, the file recovery time calculation logic 134, the memory deletion time calculation logic 136, and the memory write time calculation logic 138 for each update method. For example, when the update method is the full update method, the update time may be the sum of the transmission time, memory deletion time, and memory write time for the entire latest version file. When the update method is the partial update method, the update time may be the sum of the transmission time, memory deletion time, and memory write time for the changed sector with changes among the latest version files. When the update method is the compressed update method, the update time may be the sum of the transmission time, file recovery time, memory deletion time, and memory write time for the compressed file that compresses the latest version file. In the compressed update method, the file recovery time may be the time it takes for the vehicle controller to decompress the compressed file and recover the same to the latest version file before compression. When the update method is the difference update method, the update time may be the sum of the transmission time, file recovery time, memory deletion time, and memory write time for the difference file of the current version file and the latest version file. In the difference update method, the file recovery time may be the time it takes for the vehicle controller to restore the latest version file using the difference file and the current version file.

The update method selection logic 144 may select an update method for the vehicle controller by considering the importance of the vehicle controller 102 provided by the update file analysis portion 130. For example, the update method selection logic 144 may select the update method with the highest probability of success as the vehicle controller 102 update method when the importance of the vehicle controller 102 provided by the update file analysis portion 130 is high, e.g., when the vehicle controller 102 is an important controller related to vehicle operation safety. An important vehicle controller related to vehicle operation safety may be an engine controller or a transmission controller. The update method selection logic 144 may select the entire update method as the update method with the highest probability of success when the importance of the vehicle controller 102 is high.

As an example, the update method selection logic 144 may compare the update times for each update provided by the time confirmation logic 142 for each update, and may provide the selected update method to the transmission file generation portion 150. The update method selection logic 144 may compare the update times for each update provided by the time confirmation logic 142 for each update, and may select the update method with the smallest update time as the update method of the vehicle controller 102.

For example, when the update time of the partial update method is the smallest, the update method selection logic 144 may select the partial update method as the update method of the vehicle controller 102, and may provide the selected partial update method to the transmission file generation portion 150. When the update time of the compressed update method is the smallest, the update method selection logic 144 may select the compressed update method as the update method of the vehicle controller 102, and may provide the selected compressed update method to the transmission file generation portion 150. When the update time of the difference update method is the smallest, the update method selection logic 144 may select the difference update method as the update method of the vehicle controller 102, and may provide the selected difference update method to the transmission file generation portion 150.

Figure 5:
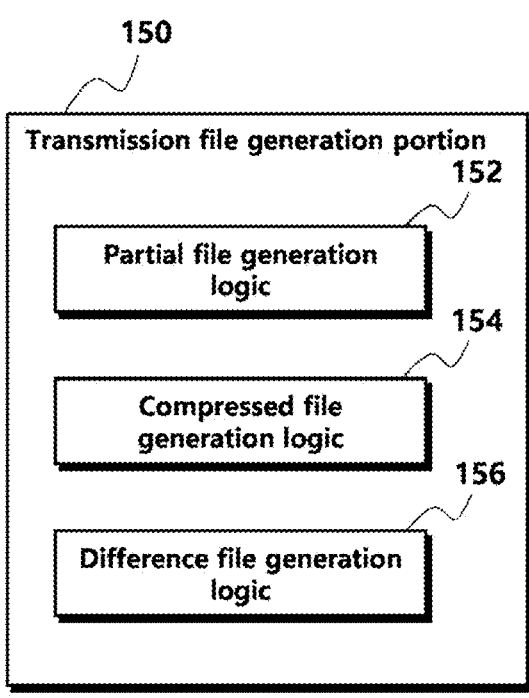
FIG. 5 is a diagram illustrating a transmission file generation portion of an update determination module, according to an embodiment of the present disclosure.

FIG. 5 is a diagram illustrating a transmission file generation portion of the update determination module, according to an embodiment of the present disclosure.

Referring to FIG. 5, the transmission file generation portion 150 of the update determination module according to an embodiment of the present disclosure may include a partial file generation logic 152, a compressed file generation logic 154, and a difference file generation logic 156.

The transmission file generation portion 150 may generate a transmission file for the latest version file according to the update method selected by the update selection portion 140, and may provide the generated transmission file to the update performance module 190.

As an example, when the update method selected by the update selection portion 140 is the full update method, the transmission file generation portion 150 may generate the entire latest version file as a transmission file, and may provide the same to the update performance module 190.

When the update method selected by the update selection portion 140 is the partial update method, the partial file generation logic 152 may collect sectors that have changed portions compared to the current version file among the latest version files and generate a transmission file, and may provide the same to the update performance module 190.

When the update method selected by the update selection portion 140 is the compressed update method, the compressed file generation logic 154 may compress the latest version file and generate a transmission file, and may provide the same to the update performance module 190.

When the update method selected by the update selection portion 140 is the difference update method, the difference file generation logic 156 may extract the difference between the current version file and the latest version file and generate a transmission file, and may provide the same to the update performance module 190.

FIGS. 6A-D are example diagrams for explaining transmission time calculation according to an update method, according to an embodiment of the present disclosure.

Referring to FIGS. 6A-D, these figures illustrate the transmission time calculation in the case of a full update method (FIG. 6A), a partial update method (FIG. 6B), a compressed update method (FIG. 6C), and a difference update method (FIG. 6D), wherein the latest version file includes 7 sectors.

As an example, the in-vehicle network 101 may be CAN or CAN FD. Transmission per Transport Protocol (TP) message may be decided by STmin. The STmin is a delay time added when transmitting consecutive communication messages to prevent buffer overflow within a gateway.

When the in-vehicle network 101 is CAN, 7 bytes may be transmitted per CAN TP. When the in-vehicle network 101 is CAN, the transmission time may be the latest version file size/7 bytes×STmin. When the in-vehicle network 101 is CAN FD, 63 bytes may be transmitted per CAN FD TP. When the in-vehicle network 101 is CAN FD, the transmission time of a file may be file size/63 bytes×STmin.

Figure 6A:
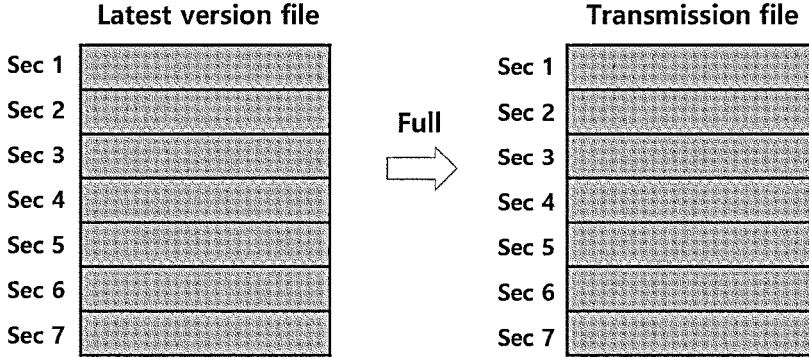
FIGS. 6A-6D are example diagrams for explaining transmission time calculation according to an update method, according to an embodiment of the present disclosure.

Referring to FIG. 6A, in the full update method, the latest version file may include 7 sectors and the transmission file may also include 7 sectors. Accordingly, in the full update method, the transmission time may be the time to transmit the entire latest version file that includes 7 sectors.

Figure 6B:
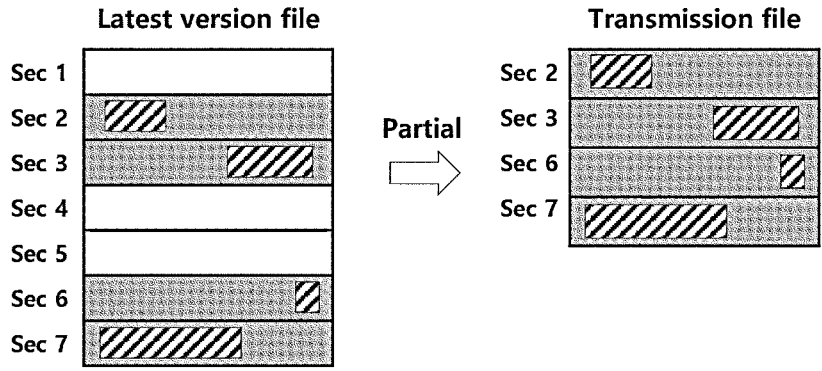

Referring to FIG. 6B, in the partial update method, the latest version file may include 7 sectors and the transmission file may include a changed sector with changes (slashed blocks) among the latest version files, i.e., sector 2, sector 3, sector 6, and sector 7. Accordingly, in the partial update method, the transmission time may be the time to transmit all changed sectors, i.e., sector 2, sector 3, sector 6, and sector 7, among the latest version files.

Figure 6C:
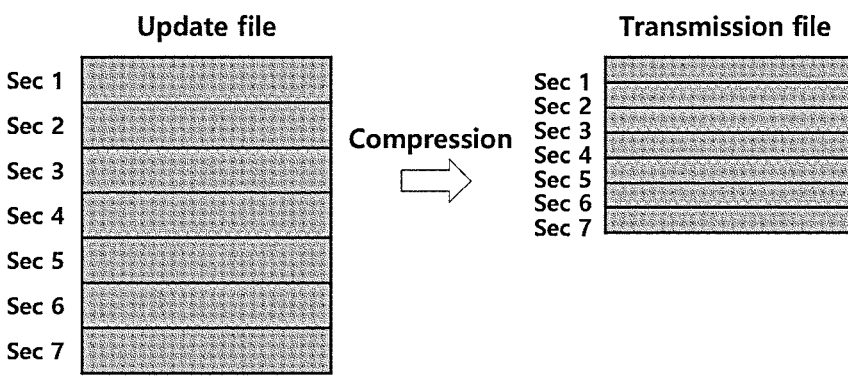

Referring to FIG. 6C, in the compressed update method, the latest version file may include 7 sectors and the transmission file may include a file that compresses the latest version of the file. The size of the compressed file may be determined by the compression rate. The compression rate may be determined by the latest version file data and DictionarySize. Depending on the DictionarySize, the size of the latest version file may be reduced by 15% to 30%. Accordingly, in the compressed update method, the transmission time may be reduced by about 15% to 30% compared to the latest version file transmission time.

Figure 6D:
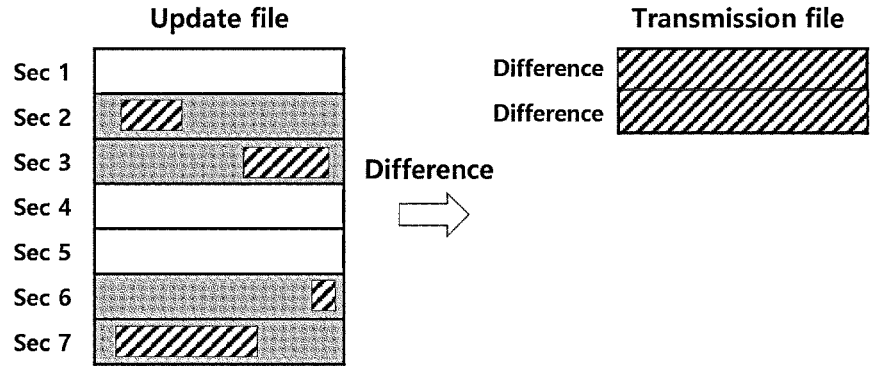

Referring to FIG. 6D, in the difference update method, the latest version file may include 7 sectors and the transmitted file may include differences (slashed blocks) between the current version file and the latest version file. In the difference update method, the size of the difference transmission file may be determined by the difference rate. The difference rate may be determined by to the difference between the current version file and the latest version file. Depending on the differential rate, the size of the difference transmission file may be reduced to 1% to 30% of the size of the latest version file. Accordingly, in the difference update method, the transmission time may be reduced by 1% to 30% compared to the latest version file transmission time.

Figure 7A:
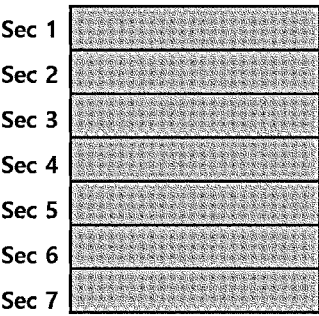
FIGS. 7A and 7B are example diagrams for explaining memory deletion time calculation according to an update method, according to an embodiment of the present disclosure.
Figure 7B:
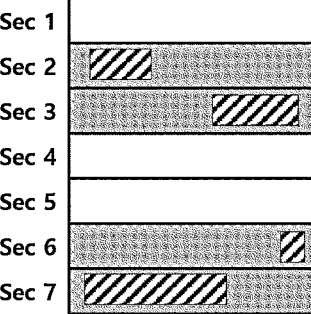

FIGS. 7A and 7B are example diagrams for explaining memory deletion time calculation according to the update method, according to an embodiment of the present disclosure.

Referring to FIGS. 7A and 7B, these figures illustrate the memory deletion time calculation in the case of a full update method and a compressed update method (FIG. 7A), and a partial update method and a compressed update method (FIG. 7B).

As an example, the memory deletion time may be the number of memory sectors×2.5 seconds.

Referring to FIG. 7A, in the full update method and the compressed update method, the deletion target may be the entire latest version file. Accordingly, the memory deletion time in the full update method and the compressed update method may be the total number of sectors of the latest version file×2.5 seconds.

Referring to FIG. 7B, in the partial update method and the difference update method, the deletion targets may be sectors with changed portions. Accordingly, the memory deletion time in the partial update method and the difference update method may be the number of deleted sectors×2.5 seconds.

Next, the calculation of file recovery time according to the update method of an embodiment is described.

As an example, the file recovery time may be calculated for the compressed update method and the difference update method. Since the full update method and partial update method do not require a file restoration process, the file recovery time may not be calculated.

In the compressed update method, the file recovery time may be the time required to decompress the latest compressed version file. The recovery time of the latest compressed version file may be determined by the compression rate. For example, in the compressed update method, the file recovery time may be (latest version file size×compression rate$^2$) ps.

In the difference update method, the file recovery time may be the time required to restore the latest version file using the current version file and the difference file. In the difference update method, file recovery time may be determined by the difference rate. For example, in the difference update method, the file recovery time may be difference file size×difference factor (0.2) milliseconds (ms).

Embodiment of the present disclosure select the update method for the latest version of the file by utilizing the transmission time, memory deletion time, and file recovery time calculation method for each update method described above.

FIG. 8 is a table illustrating update time calculation for each update method, according to an embodiment of the present disclosure.

Referring to FIG. 8, in the full update method, when the transmission file size is 1 M byte and there are 4 corresponding memory sectors, the transmission time is 250 seconds and the memory deletion time is 4 sectors×2.5 seconds=10 seconds. Accordingly, the update time according to the full update method is 260 seconds.

In the partial update method, when the transmission file size is 400 k bytes and there are 2 corresponding memory sectors, the transmission time is 100 seconds and the memory deletion time is 2 sectors×2.5 seconds=5 seconds. Accordingly, the update time according to the partial update method is 105 seconds.

In the compressed update method, when the transmission file size is 200 k bytes and there are 4 corresponding memory sectors, the transmission time is 50 seconds, the memory deletion time is 4 sectors×2.5 seconds=10 seconds, and the file recovery time is 200 k×52 picoseconds (ps)=5 seconds. Accordingly, the update time according to the compressed update method is 65 seconds.

In the difference update method, when the transmission file size is 30 k bytes and there are 2 corresponding memory sectors, the transmission time is 7.5 seconds, the memory deletion time is 2 sectors×2.5 seconds=5 seconds, and the file recovery time is 30 k×0.2 ms=6 seconds. Accordingly, the update time according to the compressed update method is 18.5 seconds.

Upon reviewing the update times calculated for each update method according to the embodiment of FIG. 8, the update time according to the full update method is the largest at 260 seconds, followed by the update time according to the partial update method at 105 seconds, and then followed by the update time according to the compressed update method at 65 seconds, and finally, the update time according to the difference update method at 18.5 seconds.

When the importance of the vehicle controller 102 is high, the vehicle update apparatus 110 may update the vehicle controller 102 by selecting the full update method regardless of the size of the update time. When the vehicle controller 102 is an important controller related to the safety of vehicle operation, it may be necessary to increase the update success probability rather than decrease the update time.

When the vehicle controller 102 is not an important controller, the vehicle update apparatus 110 may update the vehicle controller 102 by selecting a difference update method with the smallest update time.

Although the above example illustrates the case where the update time of the difference update method is the smallest, another update method may be selected depending on the distribution and change amount of changed sectors of the latest version file compared to the current version file. For example, when the amount of change is large compared to the current version file and the distribution of changed sectors is distributed throughout the latest version file, the update time of the compressed data method or partial update method may be shorter, and accordingly, a compressed update method or a partial update method, rather than a difference update method, may be selected as the update method of the vehicle controller 102.

Figure 9:
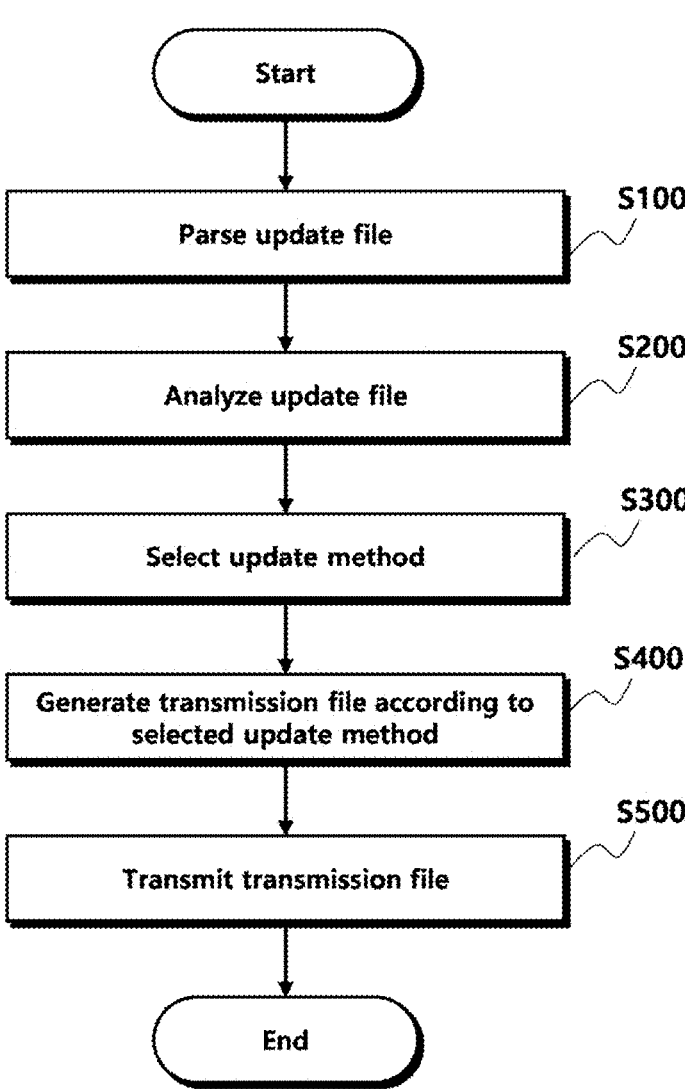
FIG. 9 is a flowchart of an example method for optimally updating a vehicle controller according to an embodiment of the present disclosure.

FIG. 9 is a flowchart of an example method for optimally updating a vehicle controller, according to an embodiment of the present disclosure.

Referring to FIG. 9, the method for optimally updating a vehicle controller according to an embodiment of the present disclosure may include parsing an update file in an operation S100, analyzing an update file in an operation S200, selecting an update method in an operation S300, generating a transmission file in an operation S400, and transmitting the transmission file in an operation S500. However, this example is merely an example, and some operations may be added or deleted as needed.

In the operation S100, parsing of the update file may include parsing of the latest version file.

As an example, in the operation S100, the vehicle controller update apparatus 100 may download the latest version file from the vehicle controller update server 10 via the communication network 20, and may parse the downloaded latest version file.

In the operation S200, analyzing of the update file may include checking of the importance of the vehicle controller 102 to be updated and calculating the update time for each update method.

As an example, in the operation S200, the vehicle controller update apparatus 100 may check whether the update target vehicle controller 102 is an important vehicle controller related to vehicle operation safety. The vehicle controller update apparatus 100 may determine that the vehicle controller 102 is of high importance when the update target vehicle controller 102 is an engine controller or a transmission controller related to vehicle operation safety, for example.

Further, in the operation S200, the vehicle controller update apparatus 100 may calculate an update time for each update method when the vehicle controller 102 is not an important vehicle controller related to vehicle operation safety. The update method may be a partial update method, a compressed update method, and a difference update method, and may also include a full update method.

In the operation S300, selecting of the update method may include selecting of an update method of the vehicle controller 102 based on the importance of the vehicle controller 102 and the update time of the latest version file.

As an example, in the operation S300, the vehicle controller update apparatus 100 may select an update method of the vehicle controller 102 based on the importance of the vehicle controller 102 determine by analyzing of the update file in the operation S200. The selected update method may be a full update method.

Further, in the operation S300, the vehicle controller update apparatus 100 may select an update method of the vehicle controller 102 based on the update time for each update method. The selected update method may be an update method selected from a partial update method, a compressed update method, and a difference update method.

In the operation S400, generating of the transmission file may include generating a transmission file for the latest version file according to the selected update method.

As an example, in the operation S400, the vehicle controller update apparatus 100 may generate a transmission file for the latest version file according to the update method selected in the operation S300.

For example, the transmission file may be one of the entire latest version file, a compressed file that compresses the latest version file, a partial file that extracts sectors with changes compared to the current version file among the latest version files, and a difference file that extracts the difference between the current version file and the latest version file.

In the operation S500, transmitting the transmission file may include updating the vehicle controller by transmitting the transmission file.

As an example, in the operation S500, the vehicle controller update apparatus 100 may transmit the transmission file generated in the operation S400 to the corresponding vehicle controller 102 to update the current version file of the vehicle controller 102 to the latest version file.

Figure 10:
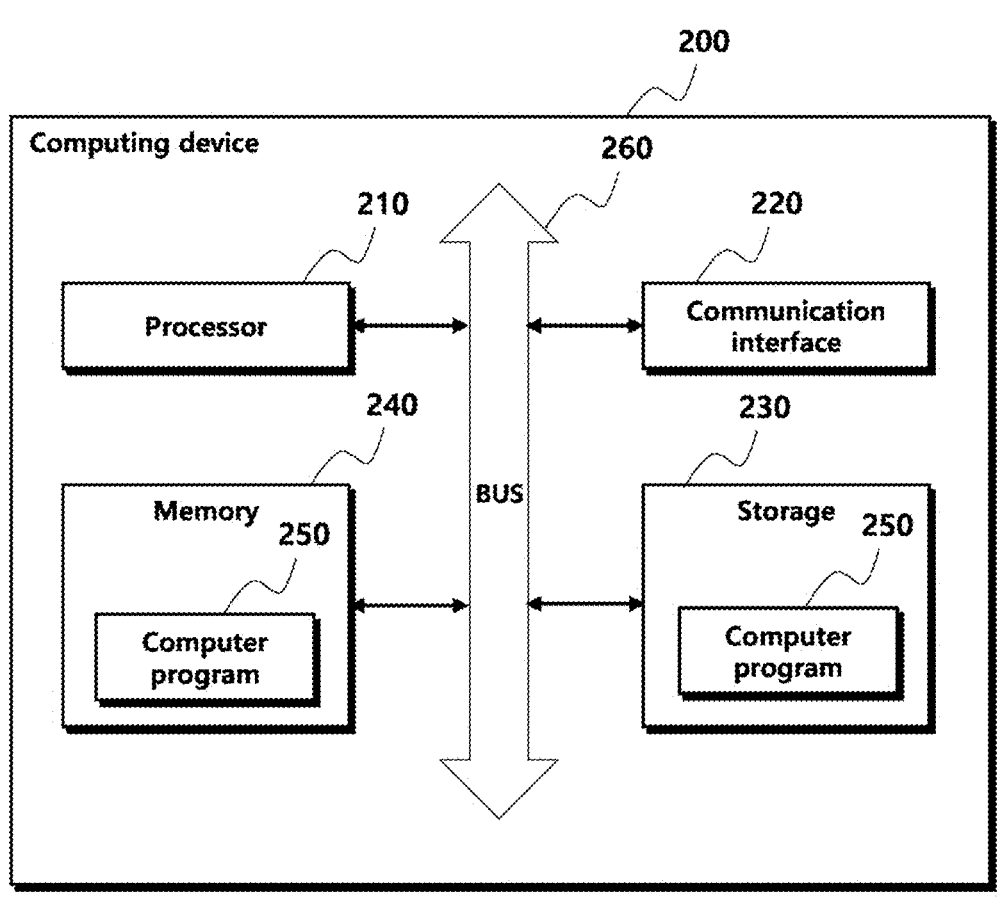
FIG. 10 is a hardware configuration diagram of a computing device, according to embodiments of the present disclosure.

FIG. 10 is a hardware configuration diagram of a computing device, according to embodiments of the present disclosure.

Referring to FIG. 10, a computing device 200 may include one or more processors 210, a system bus 260, a communication interface 220, a memory 200 into which a computer program 250 to be executed by the processors 210 may be loaded, and a storage 230 for storing the computer program 250.

The processor 210 controls overall operations of components of the computing device 200. The processor 210 may perform calculations on at least one application or program for executing a method/operation according to various embodiments of the present disclosure.

The memory 240 stores various data, instructions, and/or information. The memory 240 may load one or more computer programs 250 from the storage 230 to execute methods/operations according to various embodiments of the present disclosure.

The bus 260 provides communication functions between components of the computing device 200. The communication interface 220 supports Internet communication of the computing device 200. The storage 230 may be provided in the form of a non-transitory storage medium. The storage 230 may non-temporarily store one or more computer programs 250.

The computer program 250 may include one or more instructions according to which the methods/operations according to various embodiments of the present disclosure may be implemented. When the computer program 250 is loaded into the memory 240, the processor 210 may perform the methods/operations in accordance with various embodiments of the present disclosure by executing the one or more instructions.

Hereinbefore, various embodiments of the present disclosure and benefits thereof have been described with reference to FIGS. 1-10. The benefits according to the technical spirit of the present disclosure are not limited to those mentioned above. Other benefits not mentioned should be clearly understood by those having ordinary skill in the art from the above description.

The technical spirit of the present disclosure described above may be embodied as computer-readable code on a computer-readable medium. The computer program recorded on the computer-readable recording medium may be transmitted to another computing apparatus via a network such as the Internet and installed in another computing device, so that the computer program may be used in another computing device.

Although operations are shown in a specific order in the drawings, it should not be understood that desired results can be obtained only when the operations are performed in the specific order or sequential order or when all of the operations are performed. In certain situations, multitasking and parallel processing may be advantageous.

While the present disclosure has been particularly illustrated and described with reference to embodiments thereof, it should be understood by one of ordinary skill in the art that various changes in form and detail may be made therein without departing from the spirit and scope of the present disclosure as defined by the following claims. The embodiments should be considered in illustrative sense only and not for purposes of limitation.

Although the embodiments of the present disclosure have been described with reference to the accompanying drawings, those having ordinary skill in the art to which the present disclosure pertains should understand that the present disclosure may be modified in other specific forms without changing the technical spirit or essential features. Therefore, the embodiments described above should be understood in all respects as illustrative and not restrictive. The scope of protection of the present disclosure should be interpreted in accordance with the claims below, and all technical ideas within the equivalent scope should be construed as being included in the scope of right of the technical ideas defined by the present disclosure.

What is claimed is:

1. An apparatus for optimally updating a vehicle controller from a first version file of the vehicle controller to a second version file, the apparatus comprising:

one or more processors; and a memory storing instructions that, when executed by the one or more processors, cause the apparatus to:

check importance of the vehicle controller and calculate an update time for each update method;

select an update method of the vehicle controller based on the importance of the vehicle controller and an update time of the second version file, wherein the update method comprises at least one of a full update method, a partial update method, a compressed update method, or a difference update method;

generate a transmission file for the second version file according to the selected update method; and transmit the transmission file to the vehicle controller to update the first version file of the vehicle controller to the second version file, wherein, when calculating the update time for each update method, the update time for each update method is calculated by selecting and adding up multiple time elements among a transmission time, a file recovery time, a memory deletion time, and a memory write time for each update method.

2. The apparatus of claim 1, wherein the instructions, when executed by the one or more processors, further cause the apparatus to:

when the vehicle controller is a controller related to vehicle operation safety including an engine controller or a transmission controller, determine that the importance of the vehicle controller is high, select the full update method as the update method of the vehicle controller as, and generate the second version file as the transmission file according to the full update method.

3. The apparatus of claim 1, wherein the instructions, when executed by the one or more processors, further cause the apparatus to:

when the update method with a smallest update time of the second version file is the partial update method, select the partial update method as the update method of the vehicle controller, and generate changed sectors in the second version file as the transmission file according to the partial update method.

4. The apparatus of claim 1, wherein the instructions, when executed by the one or more processors, further cause the apparatus to:

when the update method with a smallest update time of the second version file is the compressed update method, select the compressed update method as the update method of the vehicle controller, compress the second version file according to the compressed update method, and generate the compressed second version file as the transmission file.

5. The apparatus of claim 1, wherein the instructions, when executed by the one or more processors, further cause the apparatus to:

when the update method with a smallest update time of the second version file is the difference update method select the difference update method as the update method of the vehicle controller, and generate a difference between the first version file and the second version file as the transmission file according to the difference update method.

6. The apparatus of claim 1, wherein the update time of the second version file according to the full update method and the partial update method comprises the transmission time, the memory deletion time, and the memory write time.

7. The apparatus of claim 1, wherein the update time of the second version file according to the compressed update method and the difference update method comprises the transmission time, the memory deletion time, the memory write time, and the file recovery time.

8. The apparatus of claim 7, wherein:

the update method is the compressed update method, and the file recovery time is a time to decompress the transmission file and restore the decompressed transmission file to the second version file.

9. The apparatus of claim 7, wherein:

the update method is the difference update method, and the file recovery time is a time for generating the second version file using the first version file and the transmission file.

10. The apparatus of claim 1, wherein the second version file is downloaded from a vehicle controller update server via a communication network.

11. A method for optimally updating a vehicle controller from a first version file of the vehicle controller to a second version file, the methos comprising:

checking importance of the vehicle controller and calculating an update time for each update method;

selecting an update method of the vehicle controller based on an importance of the vehicle controller and an update time of the second version file, wherein the update method comprises at least one of a full update method, a partial update method, a compressed update method, or a difference update method;

generating a transmission file for the second version file according to the selected update method; and transmitting the transmission file to the vehicle controller to update the first version file of the vehicle controller to the second version file, wherein, in calculating an update time for each update method, the update time for each update method is calculated by selecting and adding up multiple time elements among a transmission time, a file recovery time, a memory deletion time, and a memory write time for each update method.

12. The method of claim 11, wherein:

selecting the update method of the vehicle controller includes, when the vehicle controller is a controller related to vehicle operation safety, including an engine controller or a transmission controller, determining that the importance of the vehicle controller is high and selecting the full update method as the update method of the vehicle controller; and generating the transmission file includes generating the second version file as the transmission file according to the full update method.

13. The method of claim 11, wherein selecting the update method of the vehicle controller includes:

calculating the update time of the second version file for each update method, selecting an update method with a smallest calculated update time for each update method as the update method of the vehicle controller.

14. The method of claim 13, wherein the update time of the second version file according to the full update method and the partial update method is calculated by summing up the transmission time, the memory deletion time, and the memory write time.

15. The method of claim 13, wherein the update time of the second version file according to the compressed update method and the difference update method is calculated by summing up the transmission time, the memory deletion time, the memory write time, and the file recovery time.

16. The method of claim 15, wherein:

the update method of the vehicle controller is the compressed update method; and the file recovery time is a time to decompress the transmission file and restore the decompressed transmission file to the second version file.

17. The method of claim 15, wherein:

the update method of the vehicle controller is the difference update method; and the file recovery time is a time for generating the second version file using the first version file and the transmission file.

18. The method of claim 13, wherein:

selecting the update method of the vehicle controller includes, when the update method with the smallest calculated update time of the second version file is the partial update method, selecting the partial update method as the update method of the vehicle controller; and generating the transmission file includes generating changed sectors in the second version file as the transmission file according to the partial update method.

19. The method of claim 13, wherein:

selecting the update method of the vehicle controller includes, when the update method with the smallest calculated update time of the second version file is the compressed update method, selecting the compressed update method as the update method of the vehicle controller; and generating the transmission file includes compressing the second version file according to the compressed update method and generating the compressed second version file as the transmission file.

20. The method of claim 13, wherein:

selecting the update method of the vehicle controller includes, when the update method with the smallest calculated update time of the second version file is the difference update method, selecting the difference update method as the update method of the vehicle controller; and generating a difference between the first version file and the second version file as the transmission file according to the difference update method.

* * * * *